Aug. 10, 1948.   S. J. LESKIEWICZ   2,446,773
CLAMPING TOOL
Filed Jan. 9, 1946
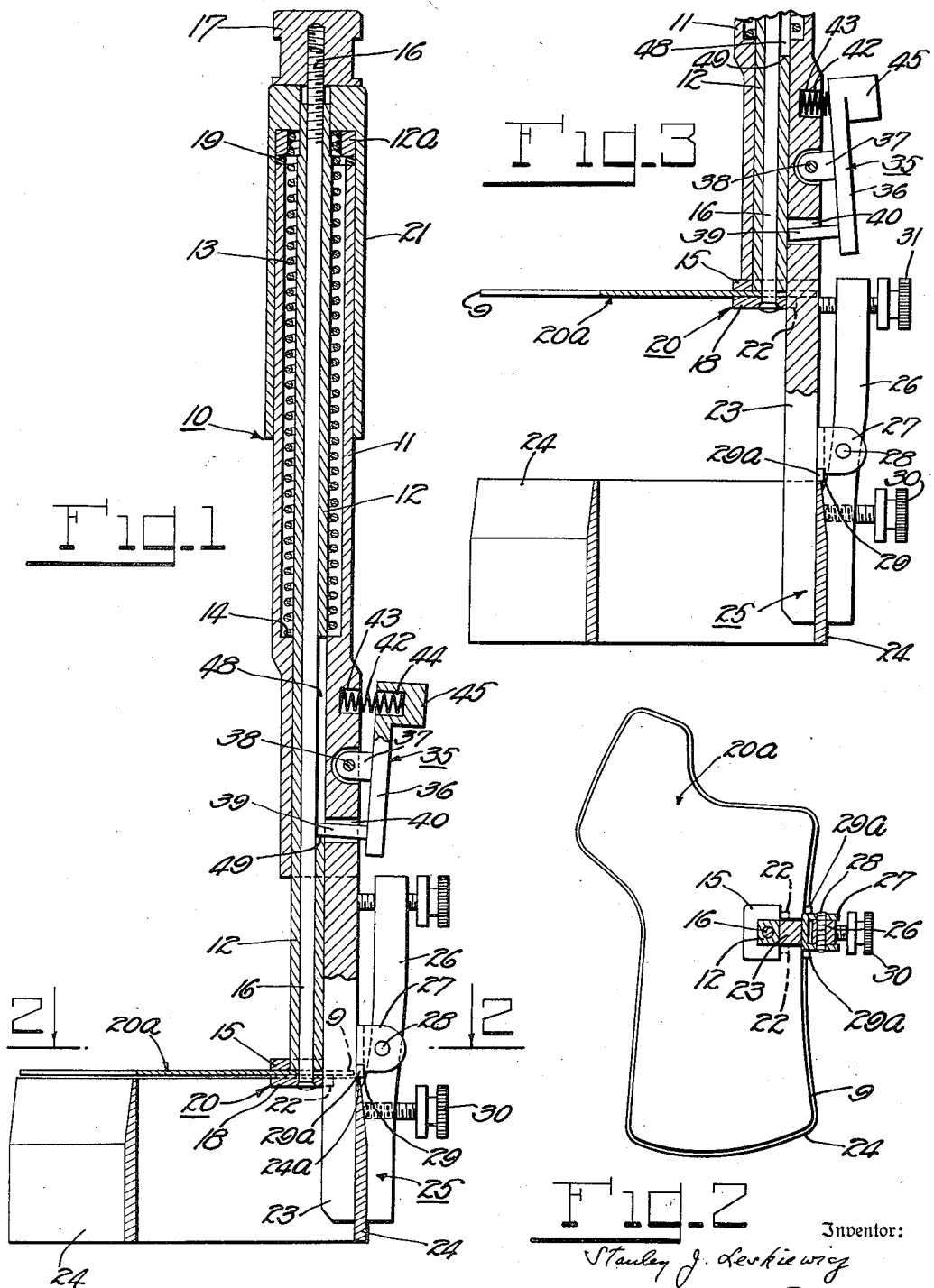
Inventor:
Stanley J. Leskiewicz
By Dike, Calver & Porter
Attorneys.

Patented Aug. 10, 1948

2,446,773

UNITED STATES PATENT OFFICE 2,446,773

CLAMPING TOOL

Stanley J. Leskiewicz, Lynn, Mass.

Application January 9, 1946, Serial No. 640,121

8 Claims. (Cl. 153—32)

This invention relates to clamping tools, used in clamping a template or pattern and die stock together for shaping cutting dies used in shoe manufacture, and more particularly, to such devices to be used in forming clicker dies which require heating in order to shape and bend them.

Previously clicker dies of this sort have been made from a strip of die stock which is heated and then bent into the form desired by hammer and anvil or mechanical bending machine. To get the proper shape for the die, it is necessary for the operator frequently and carefully to check the bends in the die stock against the template, which is a metal pattern in the form of the shoe piece desired to be cut out by the die. Bringing the template and die stock together for frequent comparison and checking involved great waste of time and effort and presented particular difficulty when the die stock had to be heated red-hot each time to permit proper bending.

My device is designed to overcome these objections by providing a clamping tool whereby the operator can hold the template and piece of die stock together in close association while the die is being formed, and heat the die stock, without heating and warping the template, or burning himself, and to enable the template and die stock to be brought into accurate registration with each other, as often as necessary.

Briefly, my device comprises releasable clamping means for the die stock, releasable clamping means for the template and for holding an edge of the latter in close engagement with an edge of the die stock, a handle to permit the operator to hold the parts in extended position away from himself, and means for bringing the template into and out of engaging relation and registration with the die-stock, during heating and otherwise.

Other objects and advantages appear in the following specification and accompanying drawing, in which:

Fig. 1 is a vertical cross-section of my clamping tool;

Fig. 2 is a horizontal section on lines 2—2 of Fig. 1, and

Fig. 3 is a side elevation of the clamping tool showing the template clamped in raised position.

In the drawing 10 represents the handle portion of my clamping tool which comprises a cylindrical tube 11 in which is slidably mounted a square shaped rod 12 having coil spring 13 mounted thereon within space provided therefor within tube 11. Spring 13 is rigidly attached at its upper end to collar 12a and presses against shelf 14 at its lower end, provided on tube 11. The bottom end of rod 12 has a plate 15 which forms the upper jaw of the template clamp 20. A cylindrical hole is drilled through tube 11 along its longitudinal axis to receive rod 16 which in turn is threaded at its upper end to receive cap 17, and at its lower end carries plate 18 which forms the lower jaw of the template clamping tool 20. The template clamping tool 20 is thus opened and tightened by means of threaded cap 17. A cylindrical sleeve 21 lies over tube 11 at its upper portion, being held thereon by cap 17, and a rubber washer 19 is preferably mounted on rod 12 at its upper end adjacent collar 12a and outside spring 13. A pair of prongs 22 on plate 18 extend around and span extension 23 of tube 11, referred to below.

Integral with the bottom end of tube 11 is the substantially square-shaped rod 23 on which the lever 26 is pivotally mounted by means of bracket 27 and pin 28, in parallel vertical relation with rod 23. The bottom end of rod 23 and of lever 26 form the respective jaws of the die-stock clamping means 25. Bracket 27 is positioned on rod 23 so that its lower edge 29 with ears 29a thereon is on the same horizontal plane with the template 20a held in template clamp 20, when in its extended position. Edge 29 and ears 29a of bracket 27 thus constitute a gauge for locating and registering the die-stock with respect to the template 20a. Set screws 30 and 31 set into the lower and upper ends of lever 26 respectively provide means for closing and opening die stock clamp 25.

Releasing means 35 for separating the template clamp 20 from association with the die stock, particularly during heating of the piece of die-stock, comprises a vertically extending lever 36 pivotally mounted on tube 11 by bracket 37 on pin 38. A latch 39 extends at right angles from the bottom end of lever 36 through an appropriate aperture 40 through extension 23, being normally tensioned therein by means of coil spring 42 set in a suitable indentation 43 in projection 23, and extend into a similar depression 44 formed in the upper end of lever 36, carrying thereon a button 45. A longitudinal slot, the side of which is indicated at 48 in Fig. 1, is provided in rod 12 and has a bottom or bottom shelf portion 49. It will be understood that latch 39 of releasing member 35 extends into slot 48 of rod 12, and holds down rod 12 in extended position by abutting against shelf 49 thereon, against the upward pull of coil spring 13, which is compressed when the template clamp is in engagement with an edge of the die-stock.

In operation, it will be understood that a strip of die-stock 24 is placed in the jaws of die clamp 25 until its upper edge 24a abuts against the bottom edge 29 and ears 29a of bracket 27 which serves as the positioning gauge for the die-stock, and is tightly secured therein by means of set screws 30 and 31. Template 20a which is a thin metal plate or pattern shaped in the form of the shoe piece which it is desired to cut out by means of the clicker die to be formed, is then inserted between the jaws 15 and 18 of template clamp 20. Template 20a has a suitable notch cut therein in its edge to extend around rod 16 and projection 23, to bring the edge 9 thereof into close engagement with the upper edge 24a of the die-stock 24. Die-stock 24 is then heated in any suitable manner, as by a gas flame, at the point where it is desired to be bent. For this purpose and to prevent template 18 from being heated and warped template 18 is lifted to its extended position away from die stock 24, as shown in Fig. 3. This is done by the operator who presses in on button 45 of releasing lever 35, which disengages latch 39 from shelf 49 of rod 12, allowing rod 12 to be lifted upwardly by the push of compressed spring 13 mounted thereon. While the die-stock is red hot, template 18 is pushed down into engagement and registration therewith, merely by pulling down on sleeve 21, which carries tube 12 with it against the force of spring 13. Die-stock 24 is then quickly bent into the desired shape in conformity with the shape of template 18 and this heating of die-stock 24 and the bending of it into the shape of template 18 is repeated until die-stock 24 has been completely formed into the shape of template 18.

By means of this clamping tool, the making of clicker dies requiring heating is greatly facilitated and the time involved in their manufacture is greatly reduced. At the same time the shape of the clicker die is more accurate because of the close engagement and registration in which the template is held against the edge of the die-stock at all times during the forming operation. The danger of the operator getting his hands burned from either die-stock or template is also largely eliminated.

It is to be understood that wherever the term "clicker dies" has been used throughout this specification, it includes "handle dies" and "Walker dies," as well, which are also bent by the application of heat. Furthermore, in the application and claims, while the clamping tool herein is stated to be used in "shaping cutting dies used in shoe manufacture" or "to form a shoe cutting die," it is to be understood that the use of the clamping tool is not so limited, because it is also useful in forming dies used for other purposes such as for making heavy pocketbooks, for cutting cloth, leather and the like, and in making dinking dies.

I claim:

1. A clamping tool for holding a template in association with die stock during bending of the latter to form a shoe-cutting die, comprising a handle portion, a rod-like extension of said handle, clamping means for said die stock mounted on said extension, clamping means for said template mounted on said extension and in alinement therewith, and means for moving said template clamping means into and out of cooperative relation with said die stock.

2. A clamping tool for holding a template in association with die stock during bending of the latter to form a shoe-cutting die, comprising a handle portion, a rod-like extension of said handle, releasable clamping means for said die stock mounted on said extension of said handle forming locating means for positioning said die stock and template together in cooperative relation, releasable clamping means for said template alined with said extension, and means for moving said template clamping means into and out of cooperative relation with said die stock.

3. A clamping tool for holding a template in association with die stock during bending of the latter to form a shoe-cutting die, comprising a handle portion, a rod-like extension of said handle, clamping jaws mounted on said extension for clamping said die stock in parallel relation with said extension, clamping jaws mounted on said extension and in alinement therewith for clamping said template in perpendicular relation to said die stock, and means for moving said template clamping means into and out of cooperative relation with said die stock.

4. A clamping tool for holding a template in association with die stock during bending of the latter to form a shoe-cutting die, comprising a handle portion, a rod extending from said handle providing gauging means for positioning said die stock and template in cooperative relation, clamping means mounted on said rod for clamping said die stock to said rod, clamping means alined with said rod having clamping jaws disposed perpendicularly to said die stock clamping means for clamping said template, and means for moving said template clamping means into and out of cooperative relation with said die stock.

5. A clamping tool for holding a template in association with die stock during bending of the latter to form a shoe-cutting die, comprising a handle portion, a rod extending from said handle providing gauging means for positioning said die stock and template in cooperative relation, releasable clamping means pivotally mounted on said extension for clamping said die stock to said rod, releasable clamping means alined with said rod having clamping jaws disposed perpendicularly to said die stock for clamping said template, and means for moving said template clamping means into and out of cooperative relation with said die stock.

6. A clamping tool for holding a template in association with die stock during bending of the latter to form a shoe-cutting die comprising a handle portion, a rod extending from said handle providing gauging means for positioning said die stock and template in cooperative relation, clamping means pivotally mounted on said rod for clamping said die stock to said rod, a second rod movably mounted in said handle and alined with said first rod and having clamping jaws for clamping said template in perpendicular relation to said die stock, and means for moving said template clamp into and out of cooperative relation with said die stock.

7. A clamping tool for holding a template in association with die stock during bending of the latter to form a shoe-cutting die, comprising a handle portion, a rod extending from said handle providing gauging means for positioning said die stock and template in cooperative relation, clamping means pivotally mounted on said rod for clamping said die stock to said rod, a second rod movably mounted in said handle and alined with said first rod and having clamping jaws for clamping said template in perpendicular relation to said die stock, means for opening and closing both said clamping means, and means for moving said template clamping means into and out of cooperative relation with said die stock.

8. A clamping tool for holding a template in association with die stock during bending of the latter to form a shoe-cutting die, comprising a handle portion a rod extending from said handle providing gauging means for positioning said die stock and template in cooperative relation, clamping means pivotally mounted on said rod for clamping said die stock to said rod, a second rod mounted in said handle and movable in alinement with said first rod having clamping jaws at its lower end for clamping said template in perpendicular relation to said die stock, spring means cooperating with said second rod, means for moving said template clamping jaws into cooperative relation with said die stock against the force of said spring, and means for locking said template clamping jaws in cooperative relation with said die stock, and for releasing the same.

STANLEY J. LESKIEWICZ.

REFERENCES CITED

The following references are of record in the file of this patent:

UNITED STATES PATENTS

| Number | Name | Date |
| --- | --- | --- |
| 2,019,789 | Mahannah | Nov. 5, 1935 |